United States Patent
Furusawa

[19]

[11] Patent Number: 5,884,079
[45] Date of Patent: Mar. 16, 1999

[54] DESIGN PART REUSING METHOD IN CONFIGURATION TOOL

[75] Inventor: Naoki Furusawa, Tokyo, Japan

[73] Assignee: Yamatake-Honeywell Co., Ltd., Japan

[21] Appl. No.: 873,573

[22] Filed: Jun. 12, 1997

[30] Foreign Application Priority Data

Jun. 17, 1996 [JP] Japan .................................. 8-155295

[51] Int. Cl.⁶ .............................. G06F 9/44; G06F 17/50
[52] U.S. Cl. ........................ 395/701; 345/349; 345/348; 345/967; 345/965; 364/192; 364/191; 364/189; 364/146; 364/147
[58] Field of Search ..................... 395/701–703; 345/348, 349, 326, 339, 115, 433, 964–968, 961; 364/188, 189, 146, 147, 130, 468.03, 468.09, 468.1, 474.22, 474.23, 474.32, 191, 192

[56] References Cited

U.S. PATENT DOCUMENTS

| | | | |
|---|---|---|---|
| 5,239,476 | 3/1994 | Wolber et al. ............................ | 345/349 |
| 5,261,043 | 11/1993 | Wolber et al. ............................ | 345/349 |
| 5,301,301 | 4/1994 | Kodosky et al. ......................... | 345/349 |
| 5,313,575 | 5/1994 | Beethe ...................................... | 345/349 |
| 5,437,007 | 7/1995 | Bailey et al. ............................. | 345/349 |
| 5,619,694 | 4/1997 | Shimazu .................................... | 707/104 |
| 5,801,942 | 9/1998 | Nixon et al. ............................. | 364/188 |

*Primary Examiner*—Tariq R. Hafiz
*Assistant Examiner*—Tuan Q. Dam
*Attorney, Agent, or Firm*—Blakely Sokoloff Taylor & Zafman

[57] ABSTRACT

In a design part reusing method in a configuration tool, a reference link defining an alias relationship between one functional object and another functional object is set. The reference link is explicitly displayed on a display between icons respectively representing one functional object and another functional object. One functional object and another functional object are set as aliases on the basis of the reference link. The reference link is explicitly disconnected to cancel the alias relationship on the display.

4 Claims, 7 Drawing Sheets

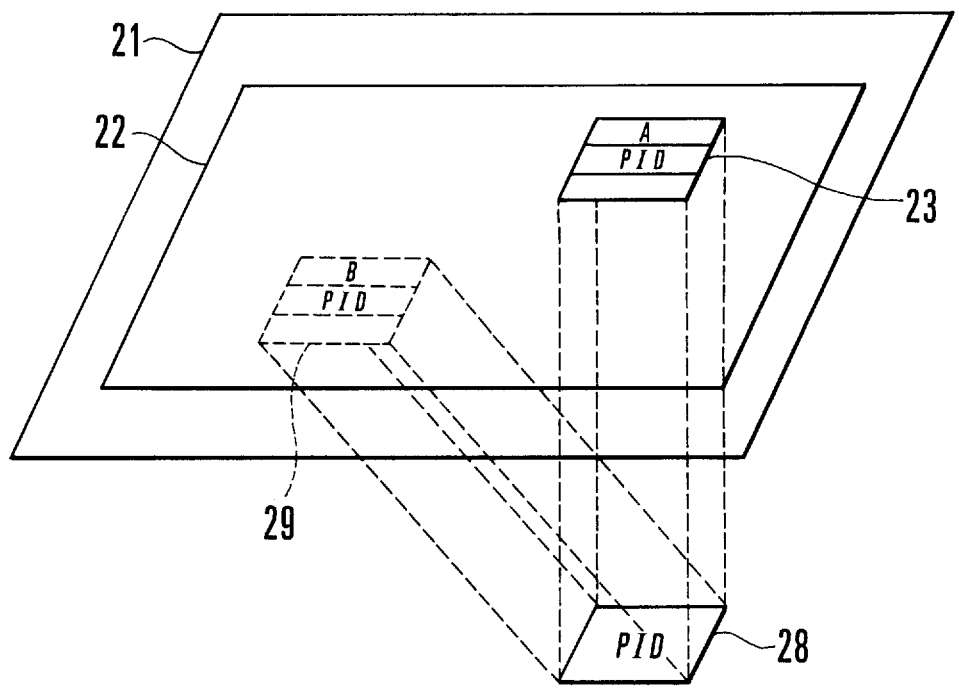
F I G. 3 A
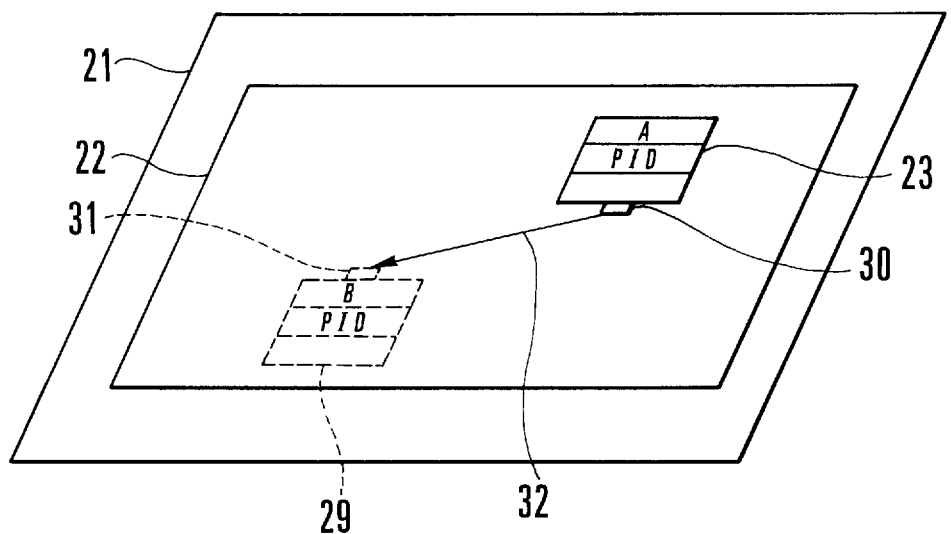
F I G. 3 B

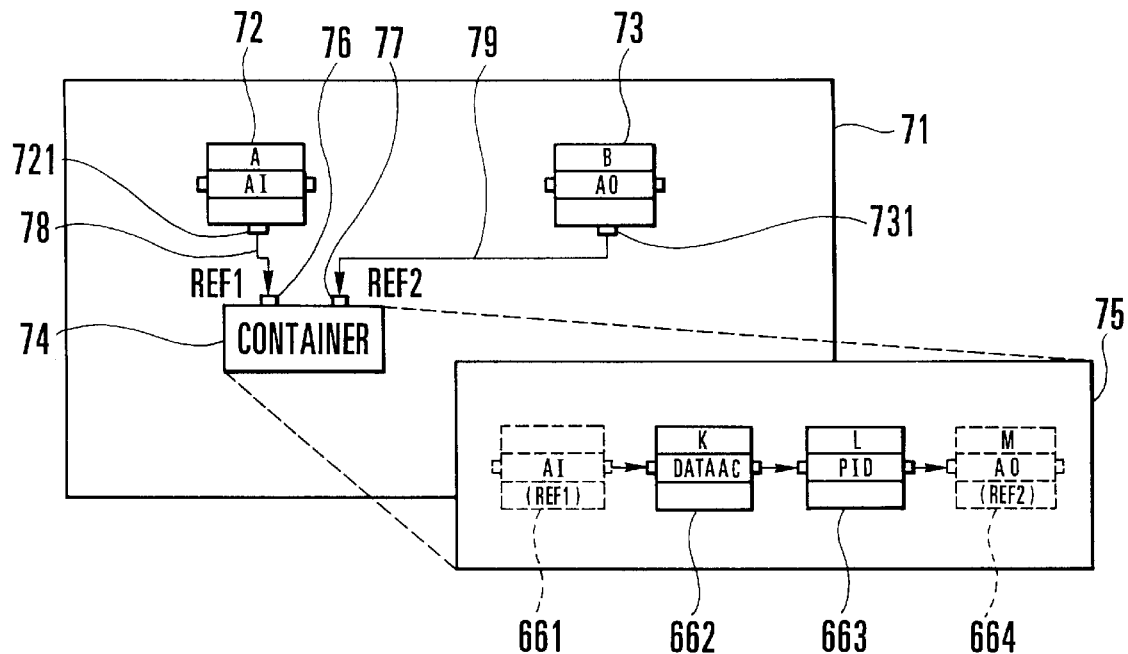
F I G. 7C
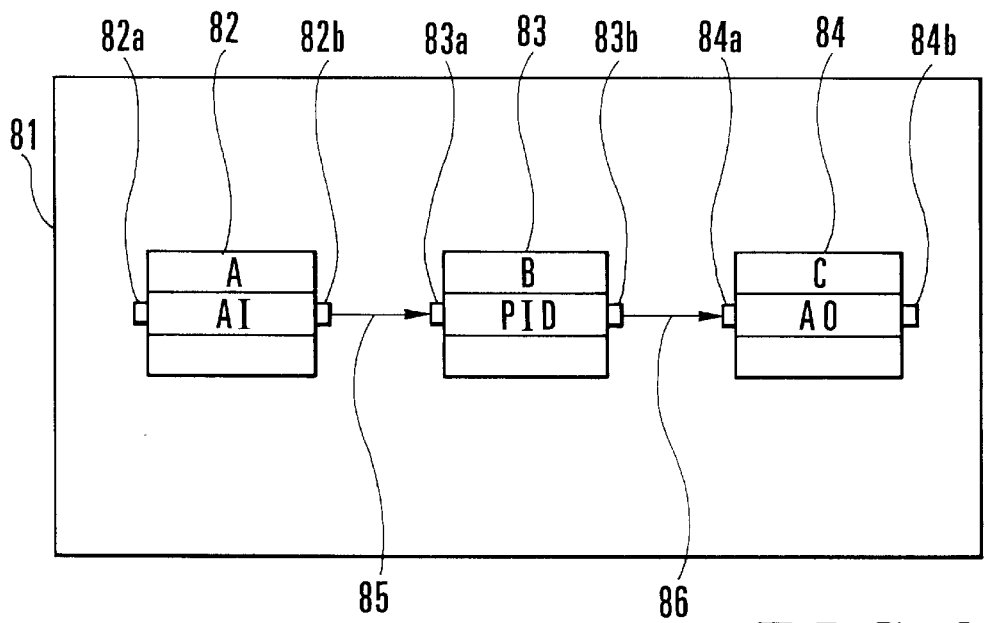
F I G. 8

DESIGN PART REUSING METHOD IN CONFIGURATION TOOL

BACKGROUND OF THE INVENTION

The present invention relates to a part reusing method of allowing a designer to smoothly reuse past design results in a control design configuration tool used to develop control software such as a system control program for a control system.

A control design configuration tool is a software system for designing a control system, converting a design result into a data form usable in a controller, and outputting the converted data. FIG. 8 shows a control design example on such a control design configuration tool. A designer displays, in an editing window or editing sheet 81 of a display, basic functional parts (to be referred to as control parts hereinafter) 82, 83, and 84 corresponding to input/output (I/O) points such as analog input (AI) parts and analog output (AO) parts and control points such as PID parts. The designer then defines connection relationships 85 and 86 of input/output terminals 82b, 83a, 83b, 84a of these control parts to design a control system and create control software.

At this time, if the past design results constituted by a plurality of control parts can be effectively reused, the efficiency of the design jobs can be improved, and hence the productivity can be improved.

In many conventional control design configuration tools, even if basic functional parts (control parts) corresponding to the minimum functional units of the controller and the set values (data) of the respective control parts are reusable, the design results constituted by a combination of a plurality of control parts cannot be reused.

In order to solve this problem, an attempt has been made to represent a design result having a specific function in the form of software IC parts on a configuration tool. More specifically, a design result (reusable parts) constituted by a plurality of control parts is defined as a black box, and input/output data associated with the function of this black box are represented by the input/output terminals of the black box.

In the form of software IC parts described above, it is difficult to obtain information serving as a clue to determine whether to apply the design result and associated with connection destinations of the input/output terminals of the reusable parts (black box). For this reason, a design result to be reused cannot be smoothly searched. That is, it is difficult to determine destination parts to be connected to the input/output terminals of the reusable parts and the attributes of the destination parts by simply observing the constituent parts of the design result to be reused. Therefore, inappropriate basic control parts may be connected to reusable parts in design due to the shortage of information associated with connections between the input/output terminals, thus degrading efficiency of design jobs.

Conventionally, in order to obtain such information, an instruction manual attached to the design result representing software IC parts, and a document describing information associated with connections between the input/output terminals must be separately searched, thus requiring a long search time.

Even if connection destination parts connected to the design result to be reused have set values or data common to the parts connected to the reusable parts, no means is provided to share these data. The same data must be input again at the reuse destination. As a result, the data input becomes time-consuming and cumbersome, and input errors may degrade the design quality.

SUMMARY OF THE INVENTION

It is an object of the present invention to provide a design environment in which a designer can smoothly reuse the data of a past design result and control parts in a control design configuration tool.

In order to achieve the above object of the present invention, there is provided a design part reusing method in a configuration tool for displaying as icons a plurality of functional objects acting as design parts having specific functions on display means of a computer, defining a data flow between the plurality of functional objects displayed by a plurality of icons by graphically expressing a connection relationship of the plurality of icons displayed on the display means, and creating application software from the plurality of functional objects whose data flow is defined, comprising the steps of setting a reference link defining an alias relationship between one functional object and another functional object, explicitly displaying the reference link on the display means between icons respectively representing one functional object and another functional object, setting one functional object and another functional object as aliases on the basis of the reference link, and explicitly disconnecting the reference link to cancel the alias relationship on the display means.

BRIEF DESCRIPTION OF THE DRAWINGS

FIGS. 3A and 3B are views for explaining an alias;

FIGS. 7A to 7C are views showing reuse of a design result and design data using a container and an alias; and FIG. 8 is a view showing a control design on a control design configuration tool.

DESCRIPTION OF THE PREFERRED EMBODIMENT

An embodiment of the present invention will be described below with reference to the accompanying drawings.

Figure 1:
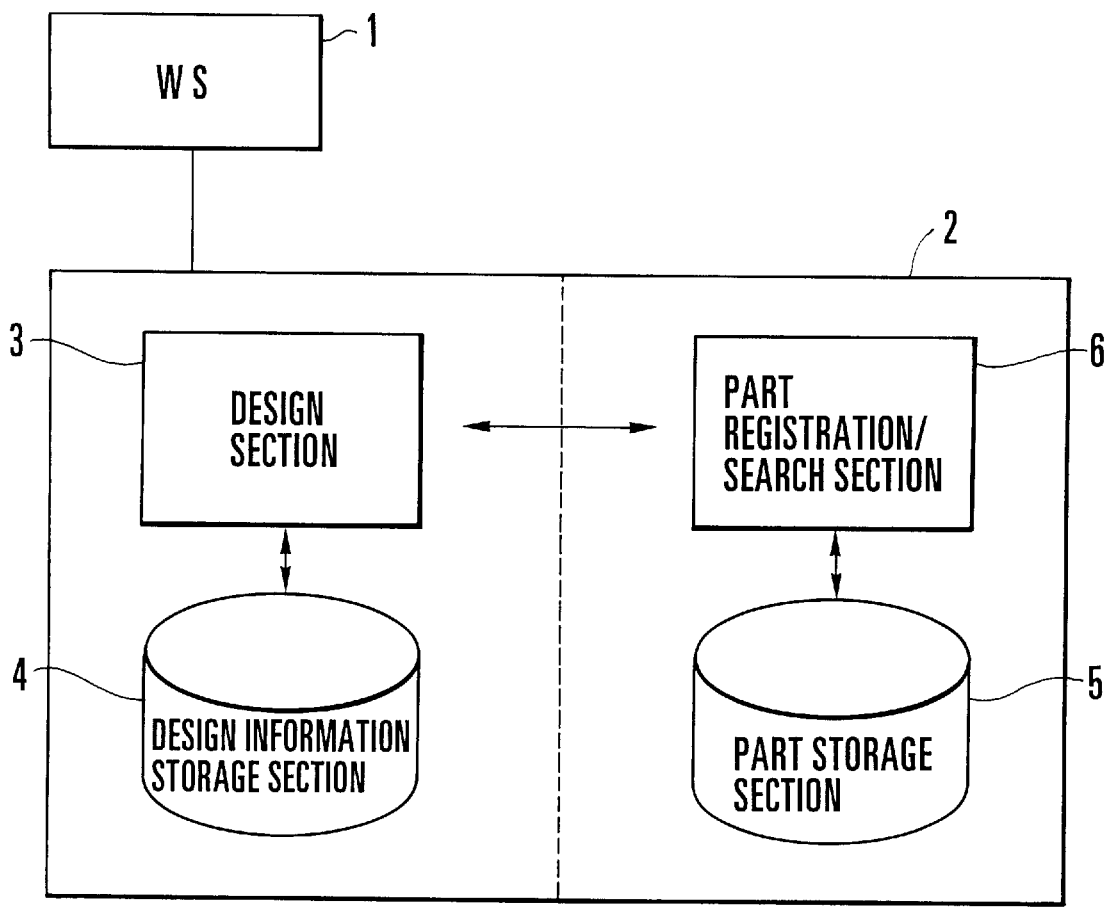
FIG. 1 is a diagram showing a control design configuration tool according to one embodiment of the present invention.

FIG. 1 shows a control design configuration tool according to one embodiment of the present invention.

A control design configuration tool 2 created on a personal computer (PC) or workstation (WS) 1 mainly comprises a design section (control block editing section) 3 for providing a design environment for allowing a designer to design a control system, a design information storage section 4 for storing a design result designed by the design section 3, a part storage section 5 for storing all or part of the design result designed by the design section 3 as reusable parts, and a part registration/search section 6 for interfacing the part storage section 5 and the design section 3.

In the design section 3, basic functional parts (control parts) having one-to-one correspondence with input/output (I/O) and control points such as analog input (AI) and PID parts are displayed as icons, and the designer defines and designs the connection relationship between these parts on an editing sheet.

Figure 2A:
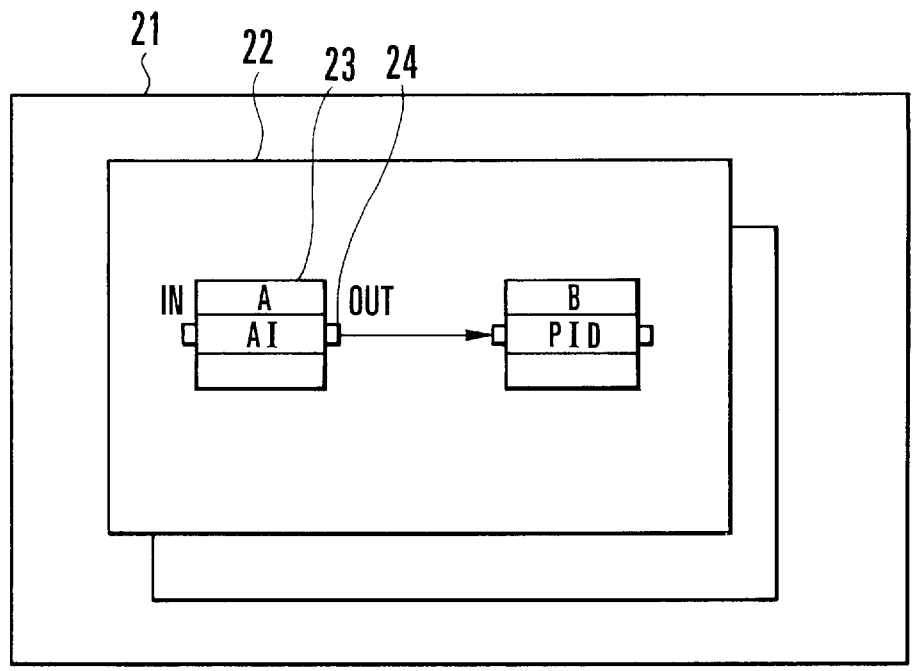
FIG. 2A is a view showing an editing window of the control design configuration tool.

FIG. 2A shows an editing window of a configuration tool representing a design state in the design section 3.

The control parts (basic functional parts) such as analog input (AI) and PID parts are displayed as icons called functional blocks. The designer defines with a mouse (not shown) the connection relationship between input/output terminals 24 of control parts 23 on a window (to be referred to as an editing sheet hereinafter) 22 opened in an editing screen 21.

Figure 2B:
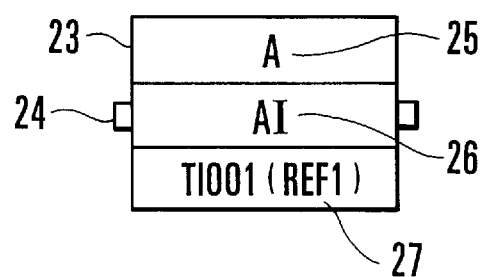
FIG. 2B is a functional block diagram of FIG. 2A.

In this embodiment, as shown in FIG. 2B, the functional block representing the control part 23 has a part name 25 representing this control part, and a function name 26 representing the function of this control part. The functional block also has a tag name representation 27 simultaneously representing the relationship between the tag name as the point name of an I/O or control point in the control system under design and other control parts.

Referring to FIG. 1, a design result designated by the design section 3 can be stored in the design information storage section 4 at the end of the design or during the design. The design result stored in the design information storage section 4 is called to the design section, modified, corrected, and re-stored in the design information storage section 4.

The designer can use as reusable parts all or part of the design result designed by the design section 3 and can store the reusable parts in the part storage section 5 through the part registration/search section 6.

The part storage section 5 which stores the past design results as reusable parts stores the part configuration (control parts) of the reusable parts, connection information between the input/output terminals of these control parts, and design data of the respective control parts in the file form.

The designer can search the part storage section 5 for appropriate reusable parts and load the searched parts in the design section 3, thereby using them for design. At this time, the part registration/search section 6 has a reusable part search function. By using this function, in searching reusable parts stored in the part storage section 5, the designer can check control parts to be connected to reusable parts and settings of these control parts by using the part registration/search section 6 or the editing sheet of the use destination in addition to the control parts constituting the reusable parts and the connections between the input/output terminals of these control parts. Therefore, the designer need not separately search an instruction manual and can determine whether a design result can be appropriately reused.

An alias which characterizes the design environment of the design section of the control design configuration tool will be described below.

As shown in FIG. 3A, this control design configuration tool has a data body (object) 28 consisting of a setting item (not shown) corresponding to the function of a basic functional part and a set value (design data) given to this setting item. The control part 23 displayed on the editing sheet 22 serves as apparent data which refer to this data body 28 and has a unique name (e.g., the name of the control part 23 is A). That is, on the editing sheet 22, the apparent data of the basic functional part is displayed together with the unique part name by the basic functional block shown in FIG. 2B.

Aliases are generally apparent data assigned with different identifiers (IDs) for referring to the same data. For example, as shown in FIG. 3A, in the configuration tool of this embodiment, a control part (basic functional block) 29 on the editing sheet 22 is apparent data which refers to the same data body 28 as that of the control part 23 and has a name different from that of the control part 23. The control part 29 is an alias for the control part 23, and the control part 23 is also an alias for the control part 29. In this case, the two control parts 23 and 29 have an alias relationship.

In order to define the alias relationship in the configuration tool of this embodiment, as shown in FIG. 3B, a reference link 32 connected from a reference port 30 formed at the control part 23 to a reference port 31 formed at the control part 29 is set on the editing sheet 22, thereby setting the control part 29 as an alias for the control part 23. That is, the alias relationship between these two control parts 23 and 29 can be explicitly represented by the reference link 32.

At this time, the control part 23 is called a reference source or reference source part. A control part such as the control part (basic functional block) 29 serving as the alias for the control part 23, having the reference port, and serving as an alias for another control or reference part is called a reference part.

The reference port and link associated with alias formation of the control parts are objects representing the alias relationship and have the following data. That is, the reference port is an object having data associated with a control part at which the reference port is formed and a reference link connected to this reference port. The reference link is an object having data associated with two reference ports serving as the start and end points of the connection (alias relationship).

In the configuration tool of this embodiment, the control parts for setting the alias relationship can be formed into aliases at arbitrary timings. For this purpose, as shown in FIG. 4, prior to setting of reference links, the designer sets a control part as a reference part having a reference port.

Figure 4A:
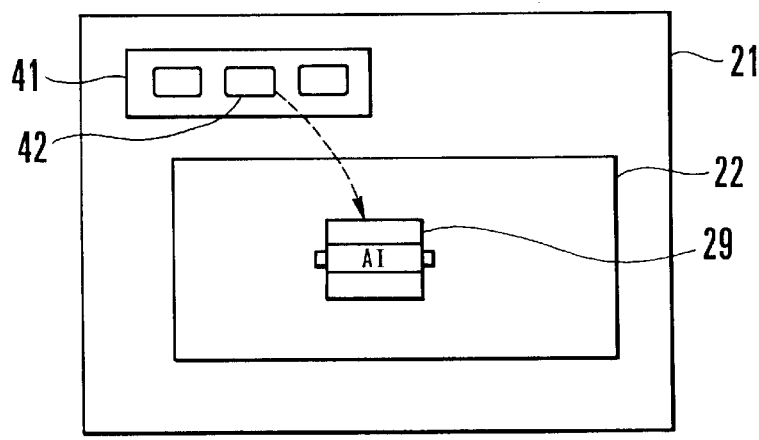
FIGS. 4A to 4C are views showing a sequence for defining control parts as reference parts.

For example, the designer selects an appropriate part 42 on the editing screen 21 with a mouse or the like to generate the control part 29 on the editing sheet 22 (FIG. 4A). Alternatively, this control part 29 may be one control part of a past design result.

Figure 4B:
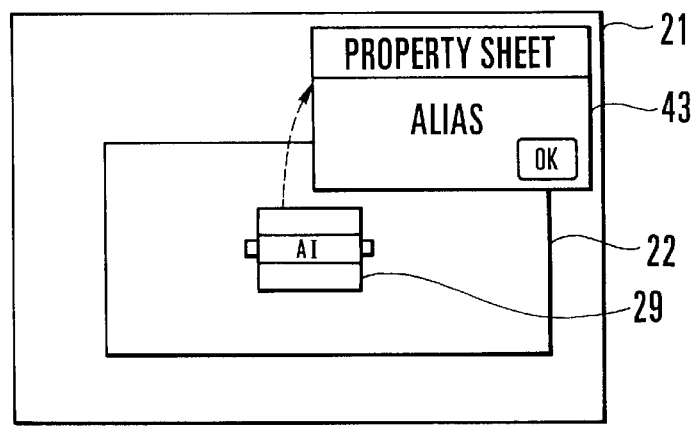
Figure 4C:
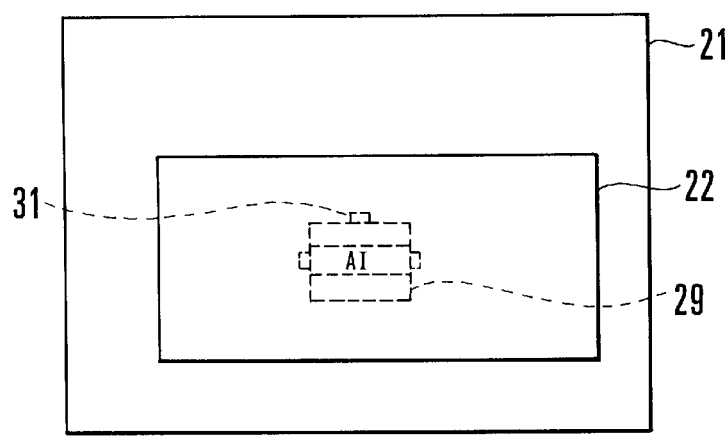

When the control part 29 is clicked, the control part opens a property sheet 43 and is changed into an "alias" (FIG. 4B). The control part 29 on the editing sheet 22 serves as a reference part. In this case, addition of a reference port on the property sheet is designated, so that the control part 29 has a reference port 31. The control part 29 changed to the reference part is indicated by the broken line in FIG. 4C. When a reference link is formed between the reference port 31 of the control part 29 changed to this reference part and the reference port of another control part serving as a reference source, the control part 29 serves as an alias of this another control part.

The alias relationship between the two control parts has been described above. A plurality of reference links may be connected from one reference source to at least two reference parts to set at least three control parts as aliases, as a matter of course.

A reference link is directly set between a reference part and another reference part having a reference source, so that the alias relationship can be set in a multi-level. In this case, the reference parts having the reference links serve as aliases which refer to the same reference source.

In addition, the reference links, i.e., the alias relationships can be set not only in the same editing sheet (e.g., the editing sheet 22), but also between control parts (reference parts) of different editing sheets (e.g., between the control part on the editing sheet 22 and a reference part 34 on an editing sheet 33).

Figure 5:
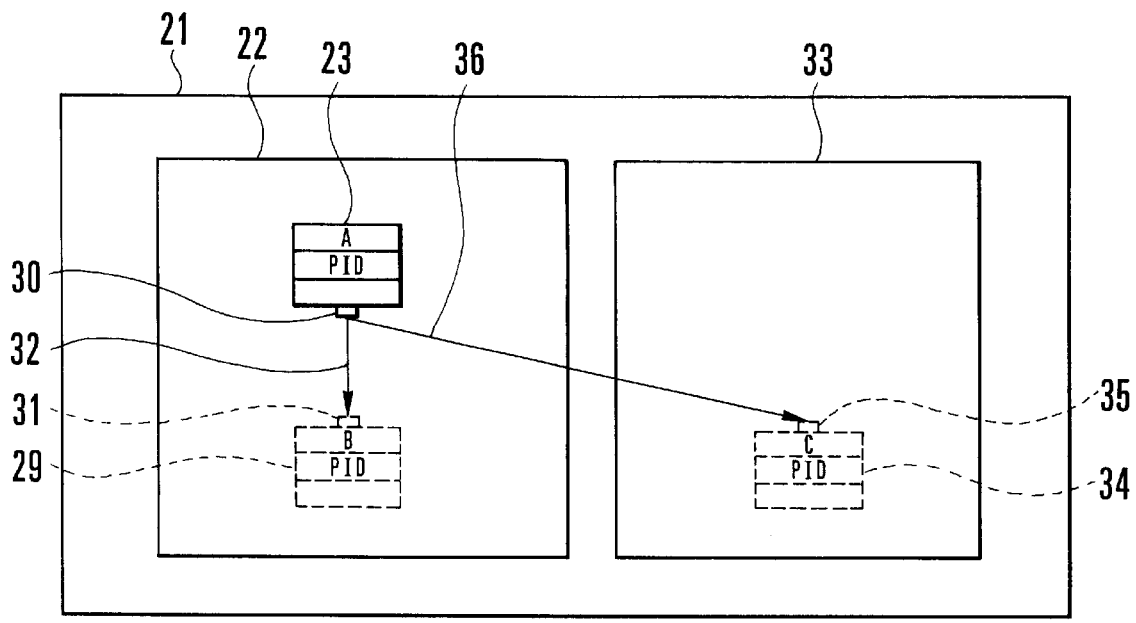
FIG. 5 is a view showing a state in which a reference link is formed between control parts in different editing sheets.

When a plurality of control parts are set as aliases, the following effect can be obtained. For example, as shown in FIG. 5, the control parts 23, 29, and 34 having the alias relationship can be regarded as identical parts. Reference links 32 and 36 are set to allow to copy data of the control part 23 serving as the reference source to the reference parts 29 and 34.

When data is changed for any one of all the plurality of control parts having the alias relationship, identical data in the remaining control parts having the alias relationship are regarded to have changed. For example, in FIG. 5, the control part 23, and the control parts (reference parts) 29 and 34 have the alias relationship. A change in data of the control part 29 allows changes in data of the control parts 23 and 34.

In this embodiment, of the two control parts (e.g., 23 and 29 in FIG. 5) having the alias relationship, the control part 23 serving as the reference source has data having a priority over the reference part 29 in principle.

Whether the data of the reference source part has a priority over that of the reference part or not can be selected and designated in units of setting items (data).

A specific setting item may be selected from a control part to set data independent of the alias relationship.

When a reference link is disconnected, i.e., when an alias relationship is canceled, the control parts having had the alias relationship become independent parts. A change in data of one control part is limited to a change in data of this control part. Even if a reference link is disconnected, the control parts hold identical data until the data are independently changed.

In the control design configuration tool according to this embodiment, a reference link can be explicitly set/connected. Control parts to be reused are changed into aliases in accordance with a given design process, thereby facilitating reuse and change of design data.

Reuse of a design result in the control design process by using an alias and a container will be described with reference to FIG. 6.

Figure 6:
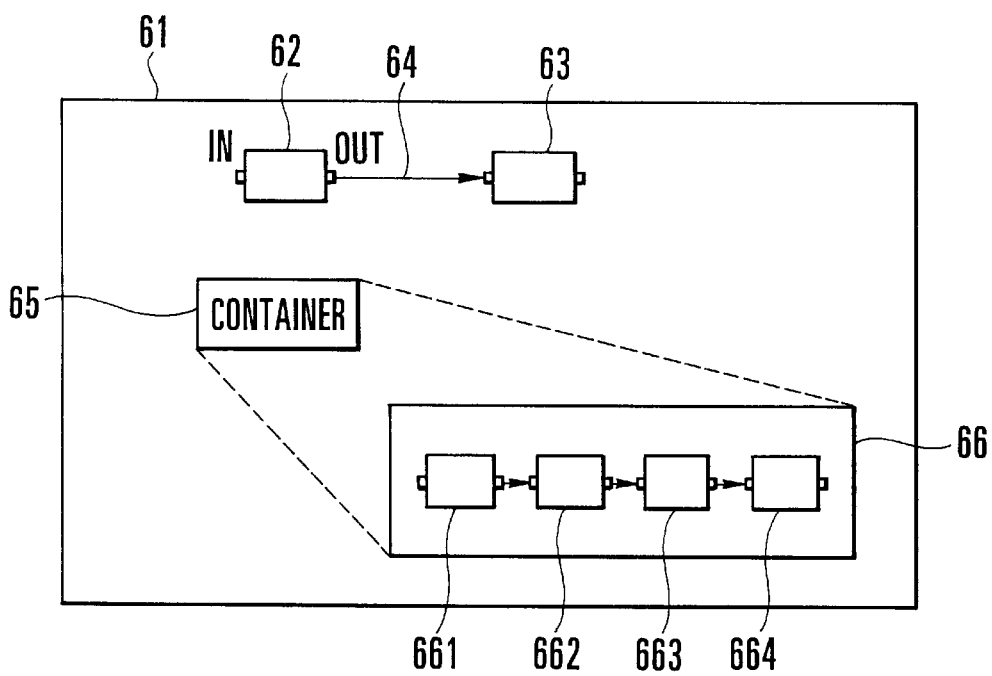
FIG. 6 is a view showing an editing window of the control design configuration tool of the embodiment of the present invention.

FIG. 6 shows an editing window for performing control design using the control design configuration tool of this embodiment.

The designer places design parts such as control parts 62 and 63 representing the basic functional parts and a container 65 (to be described later) on an editing sheet 61 to define a connection relationship (input/output relationship) 64 between the control parts 62 and 63 and set necessary data for the control parts by using a data input interface (not shown) such as a dialogue.

The container 65 has reusable parts consisting of a plurality of control parts as a subsystem. The container 65 can display the contents of the container on the editing window. For example, FIG. 6 shows a state in which the contents held by the container 65 on the first editing sheet 61 are displayed on a second editing sheet (window) 66. Therefore, the heirarchical structure of the control system can be expressed using the container.

The set of reusable parts held in the container 65, i.e., the subsystem consisting of control parts 661, 662, 663, and 664 shown on the editing sheet 66 is a past design result. As described above, this is data loaded from the part storage section 5 to the design section 3 through the part registration/search section 6 in FIG. 1, or a copy of the container as part of the past design result generated by the design section 3.

The design result and design data using aliases are reused by using the container as a container for reusable parts. This will be described with reference to FIGS. 7A to 7C.

Figure 7A:
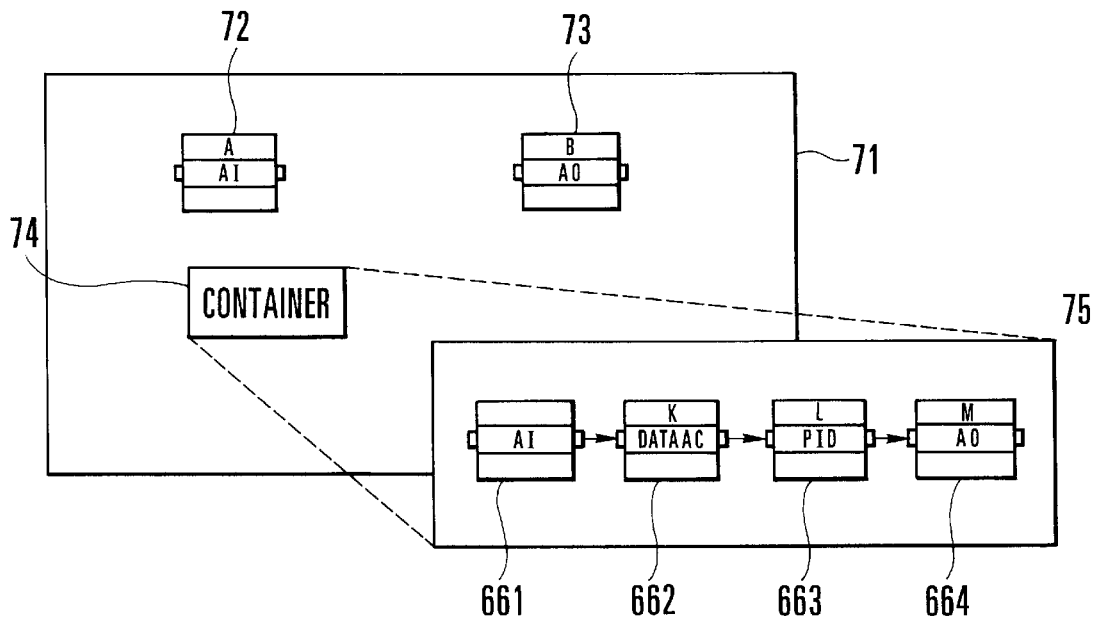

Referring to FIG. 7A, control parts 72 and 73 and a container 74 containing reusable parts are arranged on the first editing sheet 71. The reusable parts in the container 74 are displayed on the second editing sheet 75. The control parts 661 and 664 in the container 74 have the same functions (analog input (AI) and analog output (AO) functions) as those of the control parts 72 and 73 on the first editing sheet 71.

To reuse the design result fetched in the container 74, the designer performs the following sequence to set the alias relationship between these control parts.

The control parts 661 and 664 to be formed into aliases in the container 74 are changed to reference parts. However, when the control parts 661 and 664 have already been changed to the reference parts in storing this design result as reusable parts, the control parts need not be changed to the reference parts. The control parts 661 and 664 changed to the reference parts are indicated by the broken lines in FIG. 7B.

Reference ports 76 (REF1) and 77 (REF2) are set at the container 74. The control parts 661 and 664 in the container 74 are connected to the reference ports 76 (REF1) and 77 (REF2) of the container 74, respectively. This connection is called a "correlation".

Figure 7B:
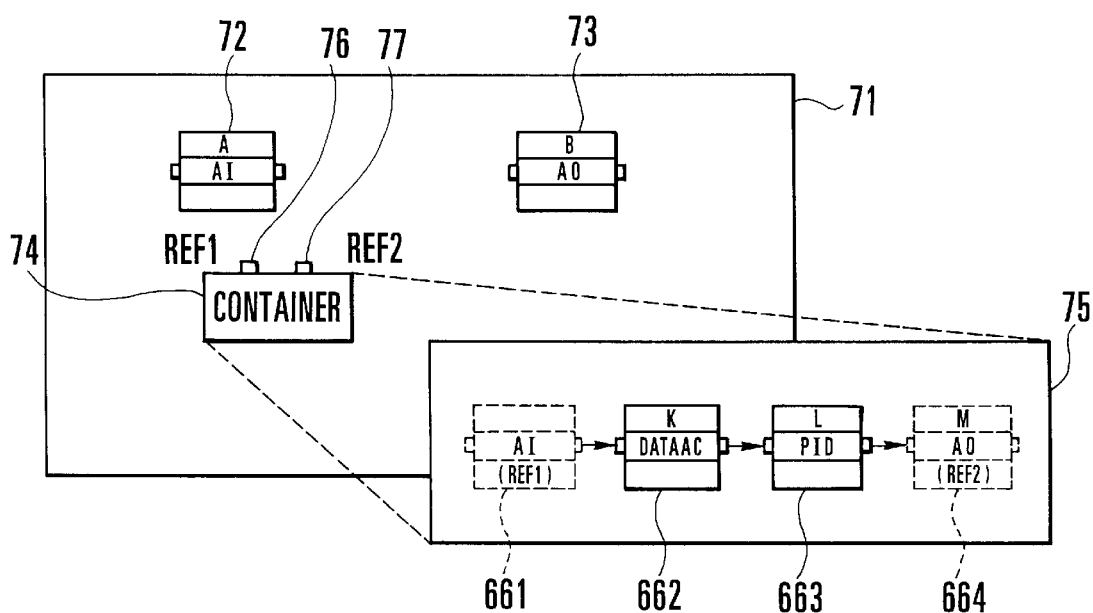

As a result, as shown in FIG. 7B, the names, i.e., REF1 and REF2, of the reference ports 76 and 77 are automatically displayed as the tag names of the reference parts 661 and 664, thereby representing the correlation with the correlated reference ports.

The designer sets reference ports 721 and 731, respectively, at the control parts 72 and 73 located outside the container. Reference links 78 and 79 are connected between the reference ports 721 and 731 and the reference ports 76 and 77 of the container 74 serving as the reference source. When the reference links are set, as described above, the reference parts 661 and 664 in the container 75 serve as aliases for the control parts 72 and 73 through the reference ports 76 and 77, respectively.

When the "correlation" in the container and the reference links located outside the container are set, as described above, the reference parts 661 and 664 in the container 74 are set, through the reference ports 76 and 77 of the container 74, as aliases for the control parts 72 and 73 located outside the container.

The designer uses the container 74 as a black box and reuses the control parts 661, 662, 663, and 664 of the design result (reusable parts) and their connection relationship. The designer may edit the internal control parts without using the container 74 as the black box and may reuse the control parts 661, 662, 663, and 664 of the design result and their connection relationship, as a matter of course.

More specifically, the container is used as a container for reusable parts and can use information associated with the input/output terminal connections of the control parts. The designer can maximally prevent erroneous connections of inappropriate basic control parts to reusable parts in design. Therefore, the efficiency of the design job can be improved.

The design data of one of the two control parts having the alias relationship, e.g., the design data of the control part 72 of the control parts 72 and 661, which serves as the reference source, can be reused as design data for the reference part 661. The designer need not reenter design data of the reference part 661 so as to match the control part 72. Data input errors can be prevented, and the design result designed as described above has a higher reliability.

In reuse of design data, the priority of data of the reference source part over that of the reference part, or vise versa can be designated for each type (setting item) of the data of the control part. For example, the design data of the control part 61 generated in the past design can be reused as the data for the control part 72. In addition, the priority order between the two aliases can be set by selecting a setting item in advance so as to reuse only the design data of a specific setting item.

The reusable parts can be flexibly used along the progress of the control design process.

The reference links 78 and 79 set between the control parts 72 and 73 as the reference sources and the reference ports 76 and 77, and the correlations between the reference ports 76 and 77 and the reference parts 661 and 664 of the container 74 can be explicitly and independently set/ disconnected at arbitrary timings in the design process.

By disconnecting the reference links and the correlations, the control parts constituting the reusable parts and their design data can be singly changed, as a matter of course.

This embodiment exemplifies a case in which a subsystem constituted by a plurality of control parts is held in one container. The first container holding the control parts constituted by the subsystem may also contain the second container holding a subsystem of the subsystem in addition to the above control parts. Even in this case, reference ports may be formed at the second container, the reference ports may be correlated to the control parts in the second container, and reference links may be set between the reference ports and the control parts in the first container, thereby defining the control parts of the second container as the aliases for the control parts of the first container.

In the above embodiment, the container is used as a container for reusable parts. This is because the heirarchical structure of the control system in the design is reflected on the design process. Therefore, the reusable parts need not be set in the container and may be directly loaded on the editing sheet on which other parts are generated.

According to the present invention, in the control design configuration tool which can use aliases, the reference links can be explicitly set/disconnected, so that the design data can be shared between the control parts constituting the reusable parts and the control parts of the connection destination parts connected to the reusable parts. The same data need not be input again at the reuse destination. Therefore, the time-consuming design data input operation can be omitted, and degradation of design quality and reliability, which is caused by input errors, can be prevented.

According to the present invention, information associated with the input/output terminal connections of the control parts and information associated with the external control parts connected to the control parts constituting the design result can be stored and referred to as reusable parts in addition to the constituent parts (control parts) of the design result. As a result, destination parts to be connected to the input/output terminals and the attributes of the destination parts can be easily determined. Efficient search can be performed upon determining whether the design result can be properly applied. Connection errors in connections between inappropriate basic control parts and reusable parts in design can be reduced, so that the efficiency of the design job can be improved.

Use of the container allows the reusable parts as the subsystem. The control design process can be facilitated while grasping the heirarchical structure of the control system as a whole.

What is claimed is:

1. A design part reusing method in a configuration tool for displaying as icons a plurality of functional objects acting as design parts having specific functions on display means of a computer, defining a data flow between the plurality of functional objects displayed by a plurality of icons by graphically expressing a connection relationship of the plurality of icons displayed on the display means, and creating application software from the plurality of functional objects whose data flow is defined, comprising the steps of:

setting a reference link defining an alias relationship between one functional object and another functional object;

explicitly displaying the reference link on the display means between icons respectively representing said one functional object and said another functional object;

setting said one functional object and the another functional object as aliases on the basis of the reference link; and explicitly disconnecting the reference link to cancel the alias relationship on the display means.

2. A design part reusing method in a design control configuration tool for performing control design by defining an input/output terminal connection between control parts corresponding to an input/output point and a control point on display means of a computer, and using an alias, comprising the steps of:

setting an arbitrary control part as a reference part serving as an alias for another control part;

forming a reference link defining an alias relationship between the arbitrary control part defined as the reference part and said another control part;

explicitly displaying the reference link between the arbitrary control part and said another control part on the display means;

setting the arbitrary control part as an alias for said another control part on the basis of the reference link; and explicitly disconnecting the reference link to cancel the alias relationship on the display means.

3. A design part reusing method in a design control configuration tool for performing control design by defining an input/output terminal connection between control parts corresponding to an input/output point and a control point on display means of a computer, and using an alias, comprising the steps of:

holding an application software subsystem constituted by a plurality of control parts in a container;

displaying the plurality of control parts held in the container on an editing window displayed on the display means;

setting an arbitrary part of the plurality of control parts held in the container as a reference part serving as an alias for another control part;

correlating the arbitrary control part in the container, which is defined as the reference part, with a reference port formed at the container;

defining an alias relationship between the arbitrary control part in the container and said another control part by forming a reference link between the reference port and said another control part located outside the container;

explicitly displaying the reference link between the reference port and said another control part on the display means;

setting the arbitrary control part as an alias for said another control part on the basis of the reference link and correlation between the arbitrary control part and the reference port; and explicitly disconnecting the reference link to cancel the alias relationship on the display means.

4. A method according to claim 3, further comprising the step of explicitly displaying the correlation between the arbitrary control part and the reference port on the editing window, and wherein the step of explicitly disconnecting the reference link to cancel the alias relationship on the display means comprises explicitly disconnecting the correlation and the reference link on the editing window and the display means.

* * * * *